United States Patent Office 3,527,251
Patented Sept. 8, 1970

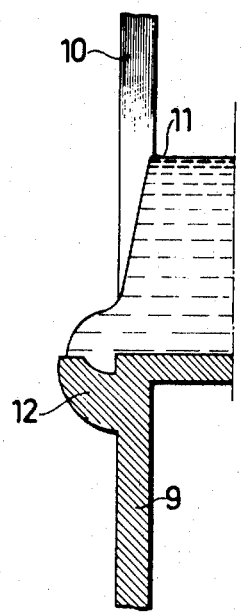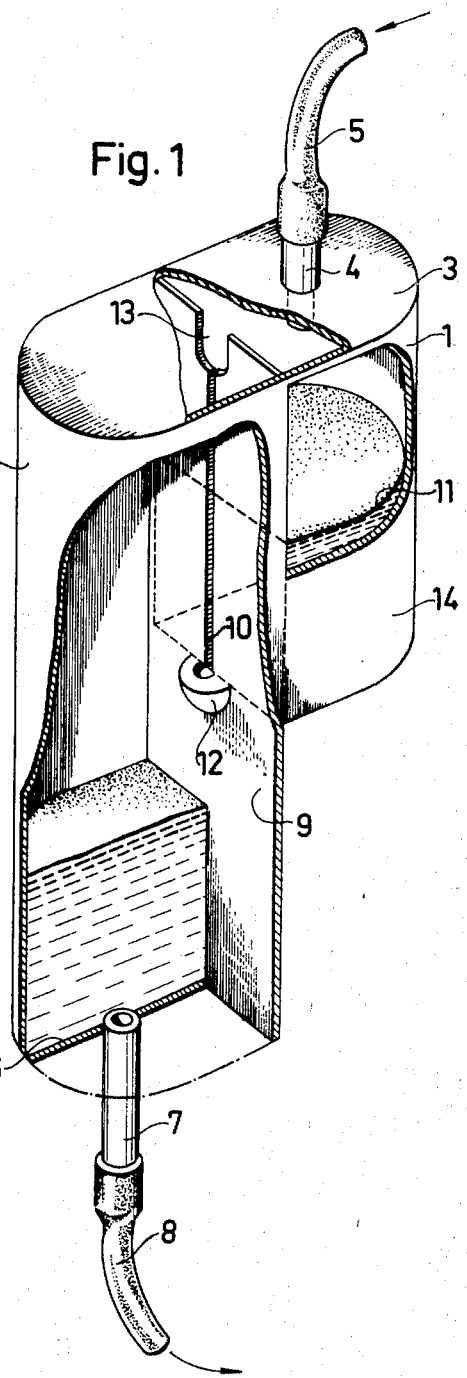

---

3,527,251
DEVICE INTENDED FOR METERING THE FLOW OF A LIQUID PREFERABLY BLOOD
Nils Olov Wilhelm Hagstrom and Bo Lennart Ostergren, Lund, Sweden, assignors to Gambro AG, Munzgraben, Switzerland, a corporation of Switzerland
Filed Oct. 28, 1968, Ser. No. 771,069
Claims priority, application Sweden, Dec. 21, 1967, 17,569/67
Int. Cl. G01f 1/00
U.S. Cl. 137—576                4 Claims

ABSTRACT OF THE DISCLOSURE

A metering device for viscous liquids, such as blood, is provided in which the liquid passes from an inlet chamber to an outlet chamber through a vertical slotted opening therebetween. Even flow of the liquid through the slot is obtained by maintaining a small amount of the liquid in the outlet chamber at the bottom of the slotted opening.

---

The present invention provides a device for metering the flow of a liquid. The invention is preferably intended to be applied to the metering of the flow of blood and similar viscous liquids.

The device according to the invention comprises an inlet chamber and an outlet chamber separated by a wall, which is provided with a slot through which the liquid flows, the flow being metered by measuring the liquid level in the inlet chamber.

The invention is characterized in that the bottom of the outlet chamber is located on a lower level than the bottom of the inlet chamber and in that a liquid collecting device in the nature of a minor bowl or the like is provided in the outlet chamber at the lower end of the slot.

Preferably, the device according to the invention is furthermore provided in the wall or partition between the inlet chamber and the outlet chamber with an overflow opening. This opening may consist of a widened portion of the slot at the upper end thereof.

The invention will be described in more detail in the following with reference to the accompanying drawing, which shows a preferred embodiment of the subject matter of the invention.

FIG. 1 is a complete view of the device, while
FIG. 2 is an enlarged detail section of the device.

The device shown comprises a semicylindrical inlet chamber 1 and an equally semicylindrical outlet chamber 2. The chamber 1 is provided with a roof 3 having a nipple 4 for connecting a blood hose 5. The chamber 2 is provided with a bottom 6 having a nipple 7 for connecting a blood hose 8. The two chambers are separated by a partition 9 which also extends below the chamber 1. In the partition proper between the two chambers 1 and 2 there is provided a slot 10. When blood is introduced through the hose 5 the blood level in the chamber 1 will become set at a specific level 11. The greater the flow, the higher the level will be. Hence, this level may be used as a metering valve for the flow. Thus, the chamber 1 may be graded in the vertical sense.

It has, however, turned out that it is very difficult to obtain an even flow through the slot 10. The reason for this is that the capillary forces will vary in dependence on whether there is a drop of blood on the outlet side of slot 10 or not. According to the invention, a liquid collecting device in the nature of a minor bowl 12 is consequently provided in order to insure that there will always be a small drop of blood at the lower end of the slot 10 in the chamber 2.

At its upper end the slot 10 widens so as to form a large opening 13 which is meant to serve as an overflow opening in case the chamber 1 should become completely filled with blood. Finally, reference numeral 14 designates the bottom of the inlet chamber.

The invention is not, of course, restricted to the embodiment described above but may be varied within the scope of the subsequent claims. Thus, the shape of the two chambers may, of course, be varied and so may the shape of the other details forming part of the invention. Preferably, the whole device is made from transparent plastic but other materials may, of course, also be used.

We claim:
1. A device for metering viscous liquids comprising an inlet chamber, an outlet chamber adjoining said inlet chamber, a partition between said chambers provided with a vertical slotted opening and extending from the bottom of the inlet chamber substantially to the top thereof allowing communication between said chambers, the bottom of said outlet chamber being below the bottom of the inlet chamber and means disposed within the outlet chamber at the bottom of the vertical slotted opening for collecting and retaining a portion of the viscous liquid to ensure the presence of such portion on that side of the slotted opening facing the outlet chamber whereby even flow of the liquid from the inlet chamber to the outlet chamber is obtained and whereby the flow of the viscous liquid may be metered by the level thereof in the inlet chamber.

2. A device as claimed in claim 1 wherein the means for collecting and retaining a portion of the viscous liquid comprises a bowl-like element on the outlet side of said partition.

3. A device as claimed in claim 1 and further comprising an opening at the top of said partion to permit overflow from the inlet chamber to the outlet chamber.

4. A device as claimed in claim 1 for metering blood and further comprising inlet means at the top of the inlet chamber and outlet means at the bottom of said outlet chamber.

References Cited

UNITED STATES PATENTS

| 1,205,294 | 11/1916 | Wallem | 137—576 X |
| 2,281,799 | 5/1942 | Quave | 137—262 |
| 3,393,696 | 7/1968 | Johnson et al. | 137—262 |

WILLIAM R. CLINE, Primary Examiner

U.S. Cl. X.R.
73—215